(12) United States Patent
Wheeler et al.

(10) Patent No.: US 9,276,621 B2
(45) Date of Patent: Mar. 1, 2016

(54) METHOD AND APPARATUS FOR DIFFERENTIAL COMMUNICATIONS

(71) Applicant: Maxim Integrated Products, Inc., San Jose, CA (US)

(72) Inventors: Erik S. Wheeler, Farmers Branch, TX (US); Bryan A. Mueller, Frisco, TX (US); Mark R. Plagens, Richardson, TX (US); Urs Mader, Cupertino, CA (US)

(73) Assignee: Maxim Intergrated Products, Inc., San Jose, CA (US)

( * ) Notice: Subject to any disclaimer, the term of this patent is extended or adjusted under 35 U.S.C. 154(b) by 0 days.

(21) Appl. No.: 14/371,980

(22) PCT Filed: Jan. 16, 2013

(86) PCT No.: PCT/US2013/021782
§ 371 (c)(1),
(2) Date: Jul. 11, 2014

(87) PCT Pub. No.: WO2013/109656
PCT Pub. Date: Jul. 25, 2013

(65) Prior Publication Data
US 2014/0348262 A1 Nov. 27, 2014

Related U.S. Application Data

(60) Provisional application No. 61/587,108, filed on Jan. 16, 2012, provisional application No. 61/587,113, filed on Jan. 16, 2012, provisional application No. 61/587,122, filed on Jan. 16, 2012.

(51) Int. Cl.
H04B 15/00 (2006.01)
H04B 1/12 (2006.01)
H04L 25/49 (2006.01)
H01M 10/48 (2006.01)
H02J 7/00 (2006.01)
H01M 10/42 (2006.01)

(52) U.S. Cl.
CPC .............. *H04B 1/123* (2013.01); *H04B 15/005* (2013.01); *H04L 25/4904* (2013.01); *H01M 10/4207* (2013.01); *H01M 10/482* (2013.01); *H01M 2010/4271* (2013.01); *H01M 2220/20* (2013.01); *H02J 7/0021* (2013.01); *Y02T 10/7055* (2013.01)

(58) Field of Classification Search
CPC .............. H01M 2220/20; H04L 25/085; H04L 25/4904; H04B 1/123; H04B 15/005; H04B 1/12

See application file for complete search history.

(56) References Cited

U.S. PATENT DOCUMENTS 5,136,580 A * 8/1992 Videlock et al. .............. 370/403
6,650,149 B1 11/2003 Wong (Continued)

FOREIGN PATENT DOCUMENTS

CN 1902822 A 1/2007
CN 101803215 A 8/2010

*Primary Examiner* — Sophia Vlahos
(74) *Attorney, Agent, or Firm* — TIPS Group

(57) ABSTRACT

A differential communication system includes a first differential communication device including a differential transmitter, a second differential communication device including a differential receiver, and a differential isolator coupling the differential transmitter to the differential receiver. The differential receiver includes a comparator operative to develop waveform region information from the received waveform, a filter adapted to remove noise from the received waveform using the waveform region information, and an adaptive sampler adapted to adjust a received waveform sampling point after it has been filtered.

11 Claims, 8 Drawing Sheets

(56) References Cited

U.S. PATENT DOCUMENTS

| | | | |
|---|---|---|---|
| 7,251,764 B2* | 7/2007 | Bonneau et al. | 714/733 |
| 2003/0164724 A1* | 9/2003 | Momtaz et al. | 327/165 |
| 2005/0135489 A1 | 6/2005 | Ho et al. | |
| 2006/0071691 A1* | 4/2006 | Garlepp | 326/93 |
| 2010/0246657 A1* | 9/2010 | Ou | 375/232 |
| 2011/0310947 A1* | 12/2011 | Flynn et al. | 375/229 |
| 2012/0082166 A1* | 4/2012 | Sala et al. | 370/401 |

* cited by examiner

| FIXED SAMPLING | | | | | | ADAPTIVE SAMPLING | | | |
|---|---|---|---|---|---|---|---|---|---|
| BIT | Sample Adjust | Sample Count | Failing Show TX count | Osc Mismatch [+/- %] | BIT | Sample Adjust | Sample Count | Failing Show TX count | Osc Mismatch [+/- %] |
| 0 | 0 | 12 | 8 | 8.33 | 0 | 0 | 12 | 8 | 8.33 |
| 1 | 0 | 20 | 16 | 5.00 | 1 | 0 | 20 | 16 | 5.00 |
| 2 | 0 | 28 | 24 | 3.57 | 2 | 1 | 29 | 24 | 5.17 |
| 3 | 0 | 36 | 32 | 2.78 | 3 | 0 | 37 | 32 | 4.05 |
| 4 | 0 | 44 | 40 | 2.27 | 4 | 1 | 46 | 46 | 4.35 |
| 5 | 0 | 52 | 48 | 1.92 | 5 | 0 | 54 | 48 | 3.70 |
| 6 | 0 | 60 | 56 | 1.67 | 6 | 1 | 63 | 56 | 3.97 |
| 7 | 0 | 68 | 64 | 1.47 | 7 | 0 | 71 | 64 | 3.52 |
| EVEN | 0 | 76 | 72 | 1.32 | EVEN | 0 | 79 | 72 | 3.16 |
| STOP | 0 | 84 | 80 | 1.19 | STOP | 0 | 87 | 80 | 2.87 |

FIG. 9

METHOD AND APPARATUS FOR DIFFERENTIAL COMMUNICATIONS

CROSS REFERENCE TO RELATED APPLICATIONS

This application is a U.S. National Stage of International Application No. PCT/US2013/21782, filed Jan. 16, 2013, which claims the benefit of U.S. Ser. No. 61/587,108, U.S. Ser. No. 61/587,113 and U.S. Ser. No. 61/587,122, all filed on Jan. 16, 2012, all of which are incorporated by reference.

FIELD OF INVENTION

This invention relates generally to differential communication devices such as UARTS and more particularly differential communication devices used in noisy and/or high voltage environments.

BACKGROUND OF INVENTION

A battery electric vehicle, or BEV, is a type of electric vehicle (EV) that uses chemical energy stored in rechargeable electric vehicle batteries (EVBs), also known as "battery packs" and "traction batteries." BEVs use electric motors and motor controllers instead of (or in addition to) internal combustion engines for propulsion. A battery-only electric vehicle or all-electric vehicle derives all of its power from its battery packs while a pluggable hybrid electric vehicle derives part of its power from its battery packs and part of its power from an internal combustion engine.

Battery pack designs for Electric Vehicles (EVs) are complex and vary widely by manufacturer and specific application. However, they all incorporate a combination of several mechanical and electrical component systems which perform the basic required functions of the pack. Moreover, battery packs incorporate many discrete cells connected in series and parallel to achieve the total voltage and current requirements of the pack. Battery packs can contain several hundred individual cells.

To assist in manufacturing and assembly, the large stack of cells is typically grouped into smaller stacks called modules. Several of these modules will be placed into a single pack. Within each module the cells are welded together to complete the electrical path for current flow. Modules can also incorporate cooling mechanisms, temperature monitors, and other devices. In most cases, modules also allow for monitoring the voltage produced by each battery cell in the stack by a battery management system, or "BMS." The battery pack also contains a variety of other sensors, such as temperature and current sensors, which are monitored by the BMS. BMS can also be responsible for communications with the world outside the battery pack.

There are generally a number of battery management systems in a battery electric vehicle. These systems may comprise a printed circuit board with discrete and/or integrated circuits and provide a number of sensor and communication protocols. In particular, battery management systems typically digitally communicate with a master battery controller and may communicate with other battery management systems.

Digital communication in the harsh environment of a battery electric vehicle can be problematical. For example, there may be common mode voltages in the tens of volts between various parts of the system. Since digital communication typically uses much lower voltages, the common mode voltages can be a problem. Furthermore, the battery electric vehicle environment may generate very high frequency noise, e.g. 100 MHz and above, which can disrupt the logic a BMS.

Because of the problems of differential communication in noisy environments, Manchester coding is sometimes used. However, prior art methods of decoding Manchester coded data are, themselves, prone to error due to a number of factors including oscillator mismatches between transmitting and receiving devices.

SUMMARY OF INVENTION

Various examples are set forth herein for the purpose of illustrating various combinations of elements and acts within the scope of the disclosures of the specification and drawings. As will be apparent to those of skill in the art, other combinations of elements and acts, and variations thereof, are also supported herein.

A differential communication device, set forth by way of example and not limitation, includes central logic, a differential transmitter coupled to the central logic, and a differential receiver coupled to the central logic. Preferably, the differential receiver includes a comparator having a differential input for a waveform and operative to develop waveform region information, a filter adapted to remove noise from the waveform using the waveform region information, and an adaptive sampler adapted to adjust a waveform sampling point after it has been filtered. The differential communication device can also include a second differential transmitter coupled to the central logic and a second differential receiver coupled to the central logic and including a comparator having a differential input for a waveform and operative to develop waveform region information, a filter adapted to remove noise from the waveform using the waveform region information, and an adaptive sampler adapted to adjust a waveform sampling point after it has been filtered.

A differential communication system, set forth by way of example and not limitation, includes a first differential communication device including a differential transmitter, a differential isolator physically separate from the first differential communication device and having a differential input coupled to a differential output of the first differential transmitter; and a second differential communication device physically separate from the first differential communication device and the differential isolator. In an embodiment, the second differential communication device includes a differential receiver including a differential input coupled to a differential output of the differential isolator and receptive to a received waveform, a comparator operative to develop waveform region information from the received waveform; a filter adapted to remove noise from the received waveform using the waveform region information; and an adaptive sampler adapted to adjust a received waveform sampling point after it has been filtered.

A method for differential communication, set forth by way of example and not limitation, includes transmitting a digital waveform from a first differential communication device to a physically separate second differential communication device through an isolator which is physically separate from both the first differential communication device and the second differential communication device, developing waveform region information on the second communication device concerning the digital waveform, filtering to remove noise from the digital waveform using the waveform region information, adjusting a digital waveform sampling point after the digital waveform has been filtered. In an embodiment, the digital waveform includes a preamble sequence that is not Manchester encoded, a Manchester encoded portion, and a stop sequence that is not Manchester encoded.

An advantage of example embodiments is that a method and apparatus for differential communication are provided that provides common-mode voltage isolation between communication devices.

Another advantage of example embodiments is that a methods and apparatus for differential communication are provided that work well for applications in which electrical noise is prevalent.

Another advantage of example embodiments is that a method and apparatus for differential communication is provided that enhances the decoding of Manchester encoded waveforms.

These and other examples of combinations of elements and acts supported herein as well as advantages thereof will become apparent to those of skill in the art upon a reading of the following descriptions and a study of the several figures of the drawing.

BRIEF DESCRIPTION OF DRAWINGS

Several examples will now be described with reference to the drawings, wherein like elements and/or acts are provided with like reference numerals. The examples are intended to illustrate, not limit, concepts disclosed herein. The drawings include the following figures:

FIG. 9 is a table illustrating an operation of the adaptive filter of FIG. 8.

DETAILED DESCRIPTION OF THE INVENTION

This application claims the benefit of U.S. Ser. No. 61/587,108, U.S. Ser. No. 61/587,113 and U.S. Ser. No. 61/587,122, all filed on Jan. 16, 2012, and all incorporated herein by reference.

Figure 1:
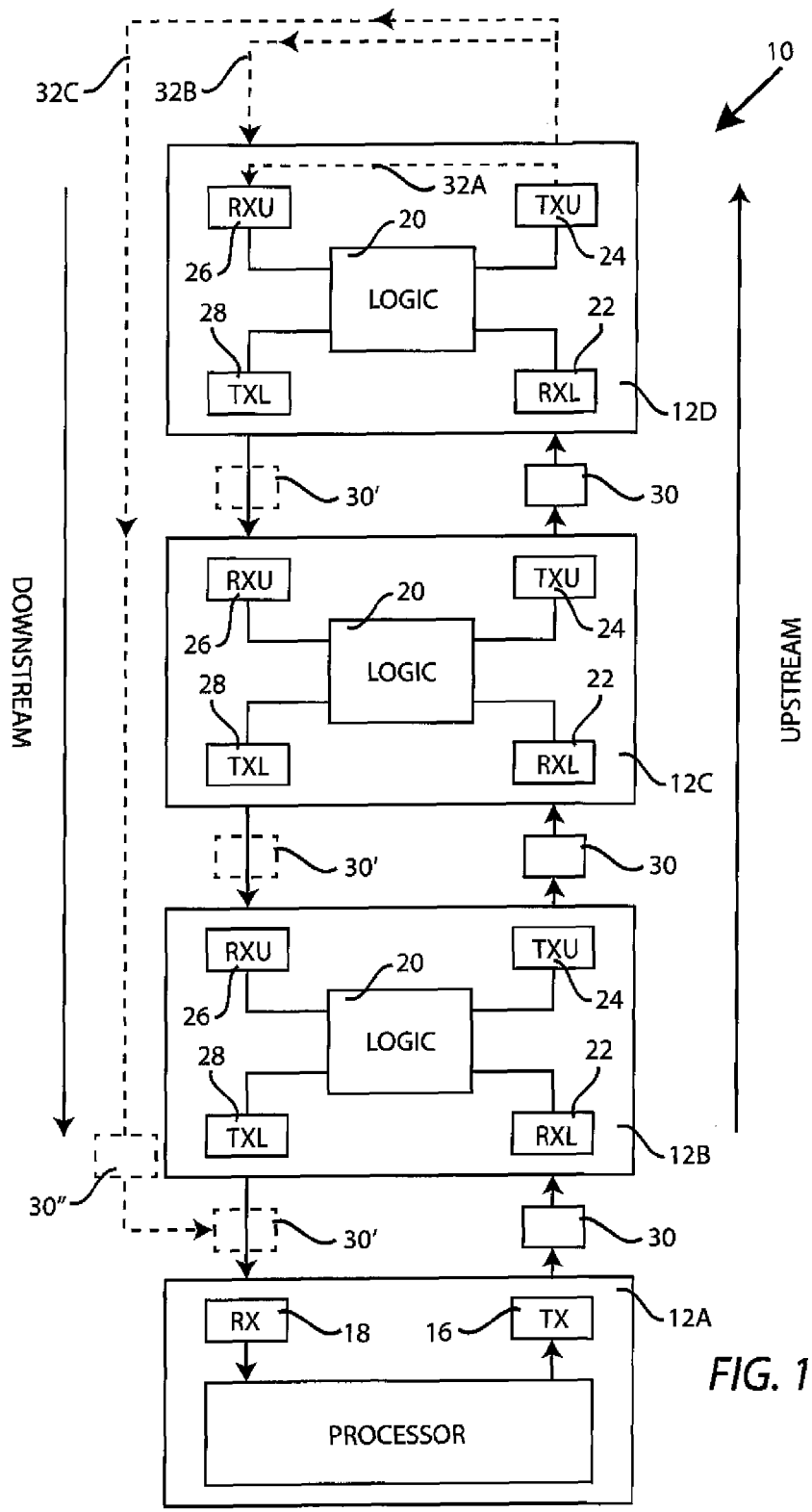
FIG. 1 is a block diagram of an example differential communication system.

FIG. 1 is a block diagram of a differential communication system 10, set forth by way of example and not limitation, which includes a number of physically separated differential communication devices 12A, 12B, 12C and 12D. In this illustration, differential communication device 12A is a host device including a processor 14, a differential transmitter Tx 16, and a differential receiver Rx 18. Differential communication devices 12B and 12C are configured as intermediate devices and differential communication device 12D is configured as a terminal device. The host device 12A communicates with the digital communication devices 12B, 12C and 12D in both an upstream (away from the host) and downstream (towards the host) direction. For example, the differential communication system 10 can be for a battery monitoring system, where the digital communication devices 12B, 12C and 12D are associated with physically separated battery monitors distributed around a battery pack. The number of differential communication devices can vary depending upon the application, but will always include at least two devices.

In this non-limiting example, each of the differential communication devices 12B, 12C and 12D include logic 20, a first receiver RXL 22 coupled to the logic 20, a first transmitter TXU 24 coupled to the logic 20, a second receiver RXU 26 coupled to the logic 20, and a second transmitter TXL 28 coupled to the logic 20. In this example, the first receiver RXL 22 of each of the communication devices 12B, 12C and 12D receive upstream communication traffic. As will be discussed subsequently, the second receiver 26 may, or may not, be used to receive downstream communication traffic.

With continuing reference to FIG. 1, differential isolators 30 may be provided between a transmitter of a differential communication device and a receiver of an adjacent differential communication device in a non-limiting example. In this embodiment, the differential isolators are physically separated from differential communication devices, and provide protection against high common-mode voltages and transients being coupled from one differential communication device to another. As noted in this figure, differential isolators 30 are provided between the transmitters and receivers of adjacent digital communication devices in the upstream data path. If the transmitter and receivers of adjacent digital communication devices are used for downstream communication traffic, differential isolators 30' are used.

The differential communication system 10 illustrates several downstream paths for communication traffic returning to the host device 12A. For example, the terminal differential communication device 12D can be configured with an internal return path 32A or an external return path 32B between transmitter TXU 24 and receiver RXU 26. With these examples, differential isolators 30' on the downstream data path are preferably included to provide downstream isolation between adjacent differential communication devices. Alternatively, an external return path 32C can be used as a downstream data path between the transmitter TXU 24 of differential communication device 12D and receiver RX 18 of differential communication (host) device 12A, preferably through an isolator 30". In this embodiment, isolators 30' may be omitted.

Figure 2:
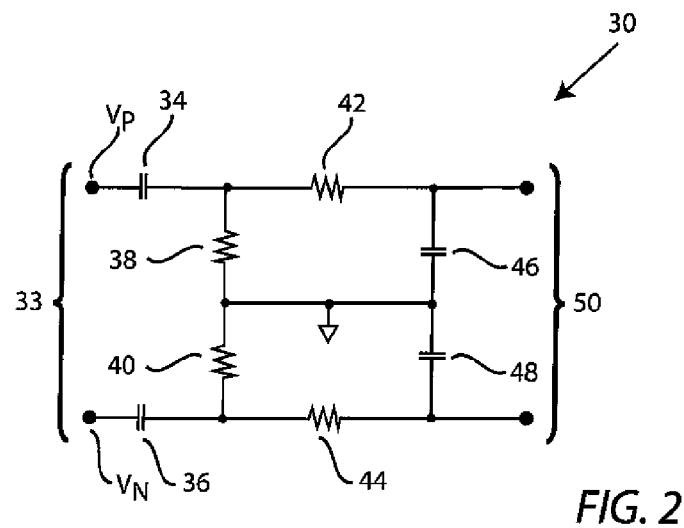
FIG. 2 is a schematic diagram of an example differential isolator of the differential communication system of FIG. 1.

FIG. 2 is a schematic diagram, set forth by way of example and not limitation, of isolator 30 of the differential communication system of FIG. 1. In this example, isolator 30 includes a differential input 33 including pair of inputs Vp and VN. A first D.C. blocking capacitor 34 has a first node coupled to the Vp differential input, and a second D.C. blocking capacitor 36 a first node coupled to the VN differential input. Second nodes of blocking capacitors 34 and 36 are coupled together by the series connection of resistors 38 and 40 which have a common node connected to ground. Second nodes of blocking capacitors 34 and 36 are also connected to first nodes of resistors 42 and 44 which have their second nodes coupled together by the series connection of capacitors 46 and 48 which have a common node connected to ground. A differential output 50 is provided which is isolated from the common-mode voltages and transients of differential inputs Vp and VN. It will be appreciated that the isolator 30 blocks D.C. components of the differential input signal and its R/C network helps attenuate the very high frequency components ("high frequency noise").

Figure 3:
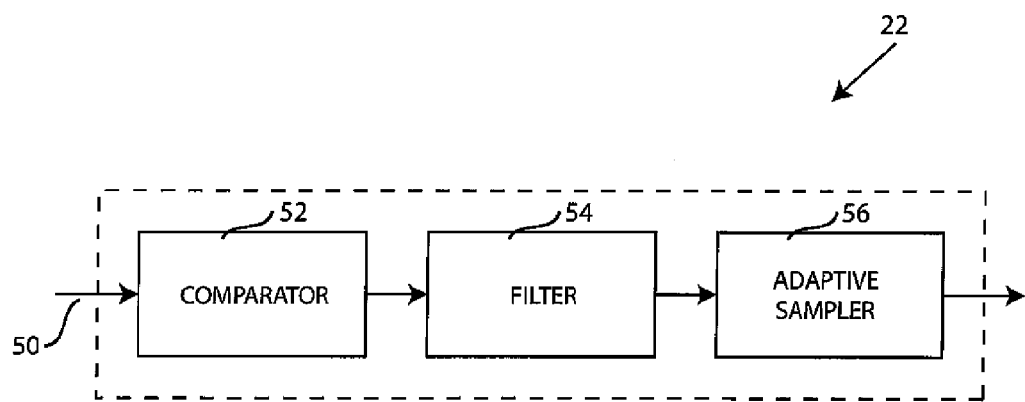
FIG. 3 is a block diagram of an example differential receiver of FIG. 1.

FIG. 3 is a block diagram, set forth by way of example and not limitation, of a differential receiver 22 of FIG. 1. In this example, differential receiver 22 includes a comparator 52, a filter 54 and an adaptive sampler 56. In this example, the comparator 52 is coupled to the differential output 50 of the isolator 30 and serves to provide reference voltages used in the filtering of an incoming waveform. Filter 54 serves to remove noise from the waveform and adaptive sampler 56 samples the waveform to detect transitions.

Figure 4:
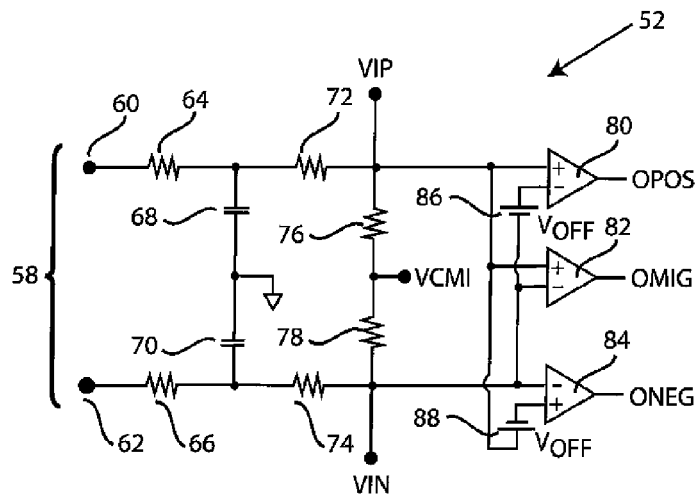
FIG. 4 is a schematic diagram of an example comparator of FIG. 3.

FIG. 4 is a schematic diagram, set forth by way of example and not limitation, of a comparator 52 of FIG. 3. In this example, comparator 52 includes a differential input 58 comprising a pair of differential input nodes 60 and 62 which is coupled to the differential output 50 of isolator 30 (see FIG. 2). A first node of a resistor 64 is coupled to differential input node 60 and a first node of a resistor 66 is coupled to differential input node 62. Second nodes of resistors 64 and 66 are coupled together by the series connection of a capacitor 68 and a capacitor 70. A node between capacitors 68 and 70 is coupled to ground. The second nodes of resistors 64 and 66 are coupled to first nodes of resistors 72 and 74, respectively. Second nodes of resistors 72 and 74 are coupled together by the series connection of resistors 76 and 78. The second nodes of resistors 72 and 74 develop an internal positive voltage (VIP) and an internal negative voltage (VIN), respectively, and a node between resistors 76 and 78 develops an internal common mode voltage (VCMI). It will therefore be appreciated that the resistors and capacitors of comparator 52 provide an R/C network that attenuates both large common mode noise and smaller differential noise to allow for the use of low voltage comparators to sense the differential (VIP-VIN) signal. A major purpose of this R/C network is to prevent large common mode voltages from clipping the low voltage comparators that will be discussed subsequently.

The example comparator 58 of FIG. 4 further includes a number of low voltage comparators including a positive comparator 80, a middle comparator 82 and a negative comparator 84. Preferably, comparators 80, 82 and 84 are hysteresis-type comparators. In this non-limiting example, a positive input of the positive comparator 80 and a positive input of the middle comparator 82 are coupled to VIP. Also in this example, a negative input of the negative comparator 84 and a negative input of the middle comparator 82 are coupled to VIN. As still further examples, a negative input of the positive comparator 80 is coupled to VIN by a first offset voltage source Voff 86 and a positive input of the negative comparator 84 is coupled to VIP by a second offset voltage source Voff 88. Positive comparator 80 has an output OPOS, middle comparator 82 has an output OMID, and negative comparator has an output ONEG.

Figure 5:
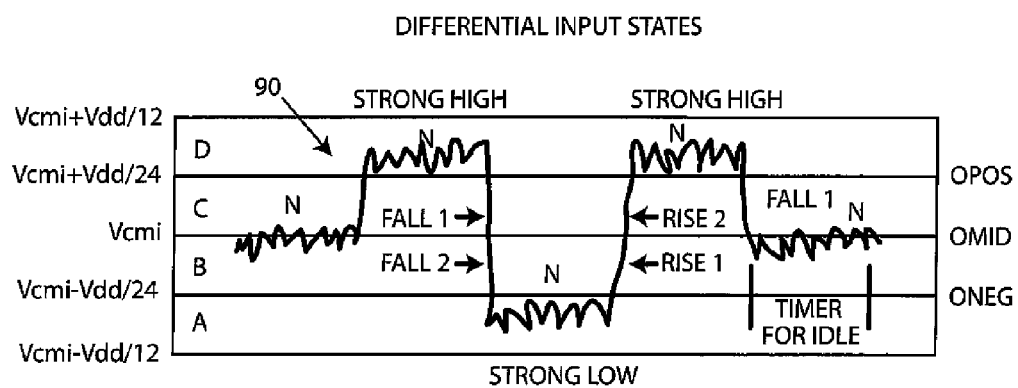
FIG. 5 is a diagram of an example digital waveform received by the comparator of FIG. 4.

FIG. 5 is a diagram of an example digital waveform 90 received by the comparator of FIG. 4. In this example, the digital waveform 90 ranges in amplitude from +Vdd to −Vdd with an idle state being at about zero (0) volts. The comparator outputs OPOS, OMID and ONEG divide that graph into 4 regions labeled A, B, C and D.

In this example embodiment, it will be appreciated that when is no signal VIP=VIN=VCMI and, if there is a signal, the comparators "trip" as follows:

$OMID=1$ if $VIP-VIN>0$, else=0

$OPOS=1$ if $VIP-VIN>Voff$, else=0

$ONEG=1$ if $VIP-VIN>-Voff$, else=0

Voff can be approximately 140 mV (based upon an attenuation network of 3.3V/24) in this non-limiting example.

Using these four regions it is possible to obtain seven (7) valid states from a waveform. Seven states are advantageous in that it helps the detection of 0/1 and 1/0 transitions and in error detection (e.g. finding 2 states that cannot coexist). In this non-limiting example, OPOS is set by the first offset voltage source 86 to be about Vdd/2, and ONEG is set by the second offset voltage source 88 to be about −Vdd/2.

It will be noted that the waveform 90 includes noise N. This noise could potentially cause an error in determining the voltage level of the waveform 90. By providing the four regions A, B, C and D it can be more accurately determined what the actual value of the waveform is at any particular sample point.

The filter 54 of a differential receiver 22 operates to filter the waveform and remove, for example, the noise N illustrated in FIG. 5. The filter 54, in this non-limiting example, can be implemented by a state machine, as will be appreciated by those of skill in the art. Other forms of filters are also suitable.

Figure 6:
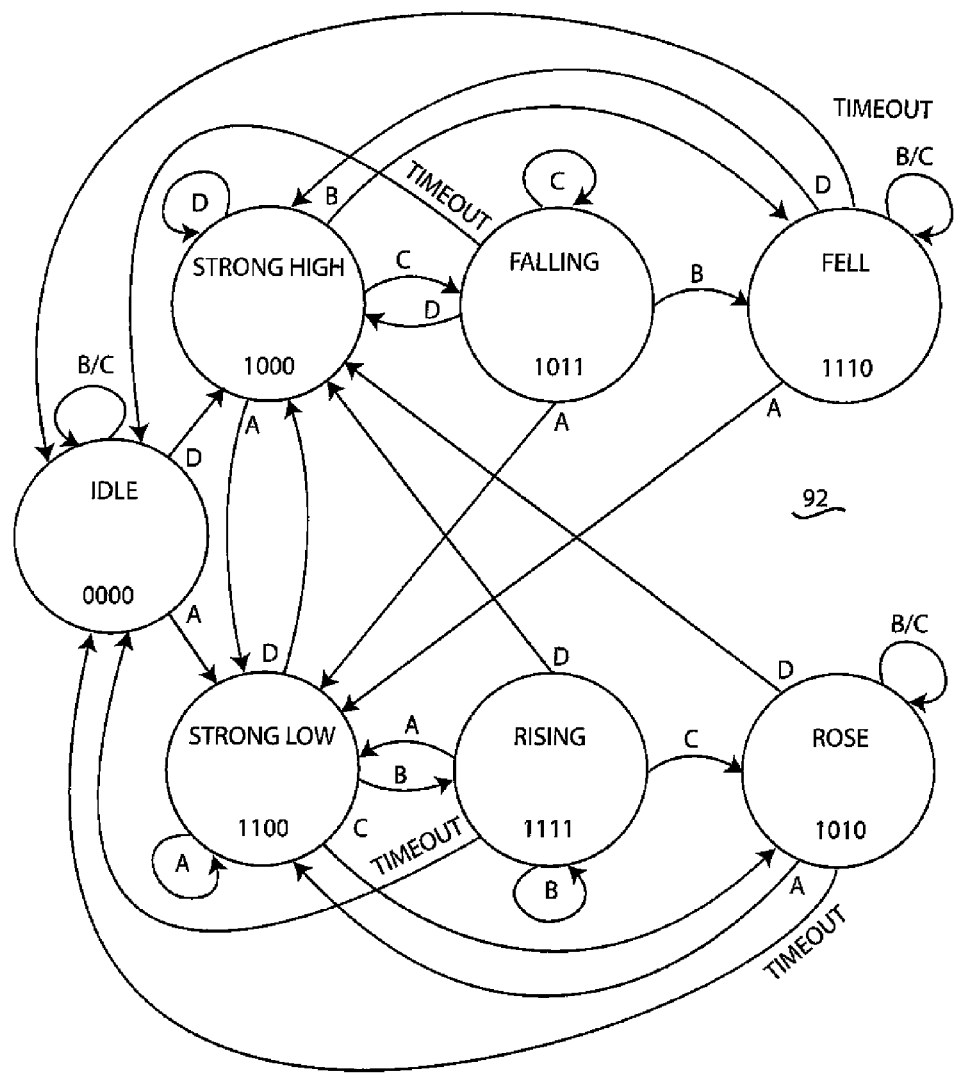
FIG. 6 is a state diagram of an example filter of FIG. 3.

FIG. 6 is a state diagram 92, set forth by way of example and not limitation, for a state machine implementation of filter 54 (see FIG. 3). In this example, there are seven different states labeled IDLE, STRONG HIGH, FALLING, FELL, STRONG LOW, RISING AND ROSE. The labels, A, B, C, and D correspond to the regions A, B, C, and D of FIG. 5. Each of the states has been assigned an arbitrary four bit code, although in other embodiments a three bit code can suffice (for seven states).

With reference to both FIGS. 5 and 6, the example waveform 90 begins in an idle state, and will remain in that state as long as the signal is in the B or C region. When the signal moves into region D, the waveform is in the STRONG HIGH state. When the signal moves into region C, the state changes to FALLING. Next, when the signal moves into region B it moves into state FELL and, as the signal moves into region A, it enters the STRONG LOW state. The state machine of the filter 54 continues with this process in order to create a clean, substantially noise-free, version of the waveform.

The transmitted waveform (e.g. waveform 90 of FIG. 5) encodes data and other information in digital form. For example, Manchester encoding can be used. As well known to those of skill in the art, Manchester encoding (also known as "Phase Encoding" or "PE") is a line code in which the encoding of each data bit has at least one transition and occupies the same time. It therefore has no D.C. component, and is self-clocking, which means that it may be inductively or capacitively coupled, and that a clock signal can be recovered from the encoded data. However, other forms of encoding can also be used if the characteristic waveform contains no D.C. component, as will be appreciated by those of skill in the art.

Figure 7:
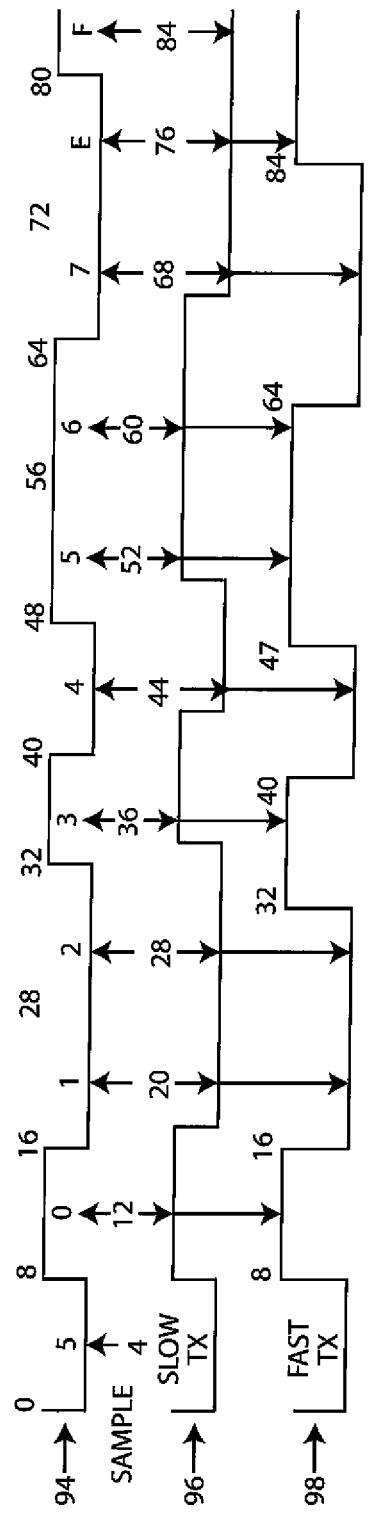
FIG. 7 is a diagram of example Manchester encoded waveforms.

FIG. 7 is a diagram of example Manchester encoded waveforms. In order to decode the waveforms, the differential receiver 22 takes a number of samples when it expects a certain state or "bit" to be present. If the differential receiver 22 takes the samples at the wrong time, an error can occur. For example, in FIG. 7 three waveforms 94, 96 and 98 illustrate standard, slow and fast transmitted versions of the same Manchester encoded signals. As noted, sampling errors can occur with the SLOW TX waveform 96 and the FAST TX waveform 98.

Figure 8:
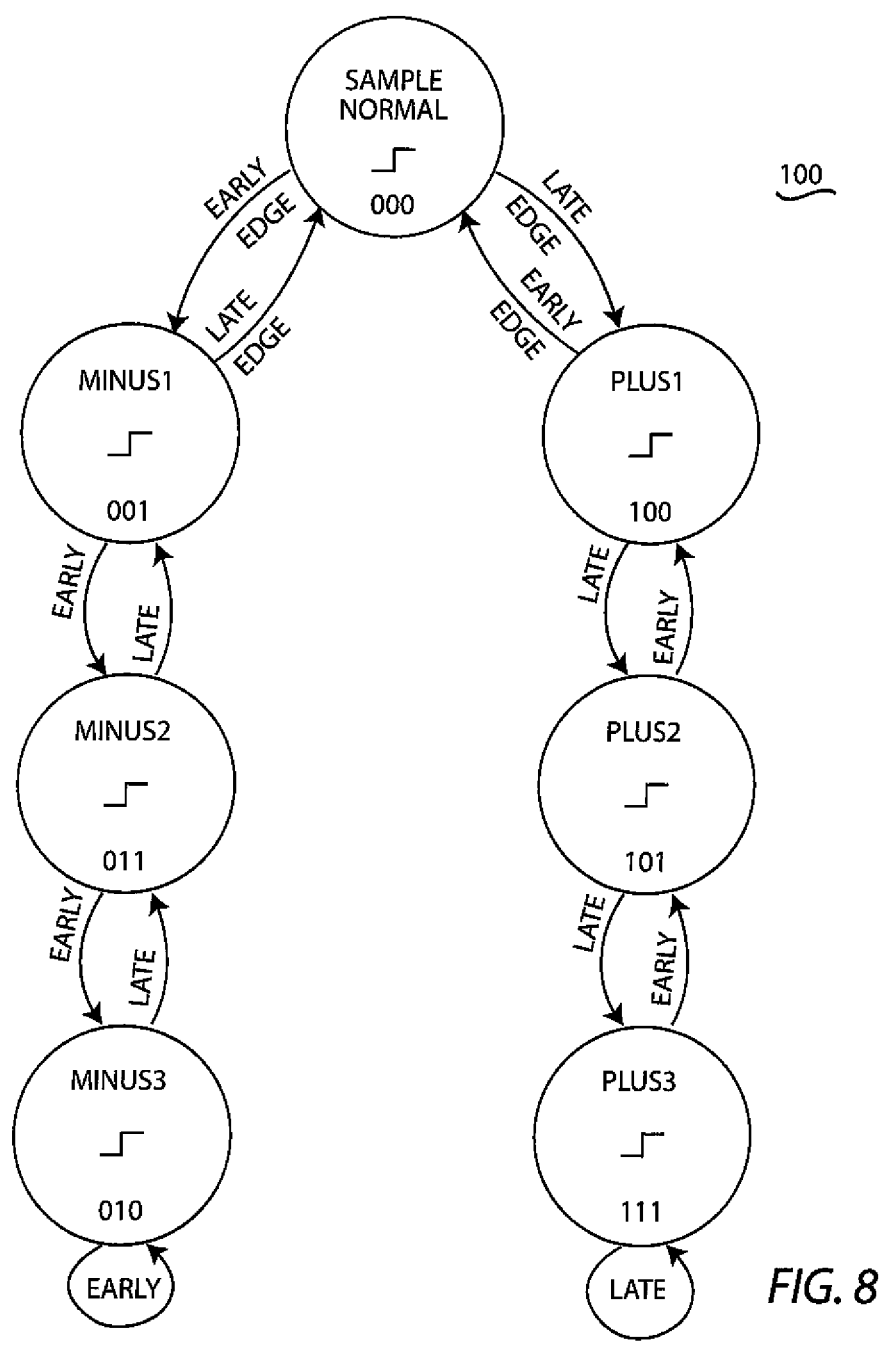
FIG. 8 is a state diagram of an example adaptive filter of FIG. 3.

FIG. 8 is a state diagram 100, set forth by way of example and not limitation, of a state machine for adaptive sampler 56 which uses the guaranteed transition between even and odd bits of a Manchester encoded waveform to resynchronize throughout the UART byte allowing for increased oscillator mismatch tolerances. The state machine begins in the STATE NORMAL state. If the adaptive sampler 56 detects an early edge, it enters the state MINUS_1. If another early edge is detected, it goes to state MINUS_2, and so forth. Detecting a late edge from the MINUS_1 state causes it to go back to the STATE NORMAL state. Similarly, when a late edge is detected when in the STATE NORMAL state the process will enter a PLUS_1 state, and so forth. The state machine of adaptive sampler 100 therefore can adjust the sampling point of the received Manchester encoded waveform by ±3 sample clock cycles to provide an adaptive sampling of the waveform.

The non-limiting example method of adaptive sampler 56 can also be explained as follows with reference to both FIGS. 7 and 8. With standard sampling technique for a system having an 8× sample clock (e.g. 2 Mbps system clock & 16 MHz sample clock), the center sample for bit n will be 4+8*n clocks after the start edge. The adaptive sampler 56 sampling adjusts the center sample a maximum of 4+8*n+/−3. In the case of a slow transmitter oscillator the final stop bit sample (@ clock 84) is usually the failing point, resulting in sampling the parity bit during the stop time. The adaptive sampling can be Adjusted as much as clock 87, giving a better chance of correctly sampling the received stop bit. In the case of a fast transmitter oscillator the final parity bit sample (@ clock 76) is usually the failing point, resulting in sampling the stop bit during the parity time. The adaptive sampling can be adjusted as much as clock 73, giving a better chance of correctly sampling the received parity bit.

FIG. 9 is a table illustrating an operation of the adaptive filter of FIG. 8 and shows a comparison of oscillator mismatch tolerance of standard sampling on the left side as compared to adaptive sampling as described above. As can be seen, adaptive sampling is a substantial improvement over standard sampling techniques.

Figure 10:
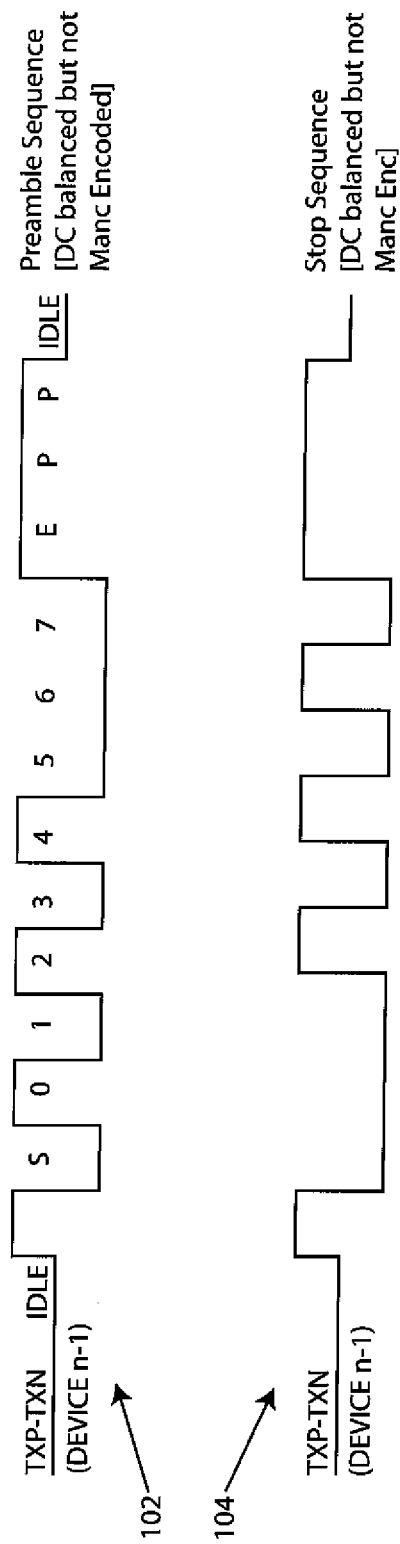
FIG. 10 is a diagram of a non-Manchester encoded preamble sequence and of a non-Manchester encoded stop sequence.

FIG. 10 is a diagram of a non-Manchester encoded preamble sequence 102 and of a non-Manchester encoded stop sequence 104 in accordance with a non-limiting example. As noted above, Manchester encoding has certain advantages in, for example, noisy electrical environments. These unique non-Manchester encoded bytes act as delimiters between packet command sequences, eliminating the need for an idle period, or other signal constraints to initiate or terminate commands. This allows the host to send continuous streams of data that can include an unlimited number of commands, or alternately allows the host to send arbitrary idle periods within a single command.

Preamble sequence 102 includes a series of pulses with each high/low time lasting 1 bit, followed by a 3 bit low period and a 3 bit high period. An independent state machine can be tasks to observe all incoming data for this sequence and re synchronize a UART byte on this sequence. In this way the host can send a continuous data stream and recover from any synchronization errors in the UART bytes. This pattern can also be used to determine the baud rate (in powers of 2 of a base baud rate) of the incoming waveform after receipt of only a single byte.

Stop sequence 104 is a Manchester "error" between bits 0 & 1 of a UART byte. By placing the Manchester error as early as possible in the byte, the device can switch from read mode to write mode with the minimum receiver-to-transmitter latency (2 bits). In an example embodiment, Manchester encoded data is combined with Even Parity bit plus 2 stop bits to produce a byte (waveform) of 6 high bits+6 low bits. This DC balanced waveform allows for transmission with capacitive coupling without the need for a D.C. restore phase.

Although various examples have been described using specific terms and devices, such description is for illustrative purposes only. The words used are words of description rather than of limitation. It is to be understood that changes and variations may be made by those of ordinary skill in the art without departing from the spirit or the scope of any examples described herein. In addition, it should be understood that aspects of various other examples may be interchanged either in whole or in part. It is therefore intended that the claims herein and hereafter presented be interpreted in accordance with their true spirit and scope and without limitation or estoppel.

What is claimed is:

1. A differential communication device comprising:
   central logic;
   a differential transmitter coupled to the central logic; and
   a differential receiver coupled to the central logic, the differential receiver including:
   (a) a comparator having a differential input for a waveform and operative to develop waveform region information;
   (b) a filter adapted to remove noise from the waveform using the waveform region information, wherein the filter is implemented as a state machine including a waveform region idle state, a waveform region strong high state, a waveform region falling state, a waveform region fell state, a waveform region strong low state, a waveform region rising state and a waveform region rose state; and
   (c) an adaptive sampler adapted to adjust a waveform sampling point after it has been filtered.

2. A differential communication device as recited in claim 1 wherein the comparator includes a resistive divider developing a positive input voltage (VIP), a negative input voltage (VIN), and a common mode input voltage (VCMI).

3. A differential communication device as recited in claim 1 wherein the adaptive sampler is implemented as a state machine.

4. A differential communication device as recited in claim 1 wherein the waveform includes a Manchester encoded portion.

5. A differential communication device as recited in claim 1 wherein the waveform includes a preamble sequence that is not Manchester encoded and a stop sequence that is not Manchester encoded.

6. A differential communication device as recited in claim 1 wherein the differential transmitter is a first differential transmitter and the differential receiver is a first differential receiver, and further comprising:
   a second differential transmitter coupled to the central logic; and
   a second differential receiver coupled to the central logic, the second differential receiver including:
   (a) a comparator having a differential input for a waveform and operative to develop waveform region information;
   (b) a filter adapted to remove noise from the waveform using the waveform region information; and
   (c) an adaptive sampler adapted to adjust a waveform sampling point after it has been filtered.

7. A differential communication device comprising:
   central logic;
   a differential transmitter coupled to the central logic; and
   a differential receiver coupled to the central logic, the differential receiver including:
   (a) a comparator having a differential input for a waveform and operative to develop waveform region information;
   (b) a filter adapted to remove noise from the waveform using the waveform region information; and
   (c) an adaptive sampler adapted to adjust a waveform sampling point after it has been filtered;

wherein the comparator includes a resistive divider developing a positive input voltage (VIP), a negative input voltage (VIN), and a common mode input voltage (VCMI); and wherein the comparator includes a first comparator, a second comparator and a third comparator.

8. A differential communication device as recited in claim 7 wherein a positive input of the first comparator and a positive input of the second comparator are coupled to the VIP.

9. A differential communication device as recited in claim 7 wherein a negative input of the third comparator and a negative input of the second comparator are coupled to the VIN.

10. A differential communication device as recited in claim 7 wherein a negative input of the first comparator is coupled to the VIN by a voltage source.

11. A differential communication device as recited in claim 7 wherein a positive input of the third comparator is coupled to the VIP by a voltage source.

* * * * *